United States Patent
Venghaus et al.

(10) Patent No.: US 7,370,472 B2
(45) Date of Patent: May 13, 2008

(54) METHOD AND APPARATUS FOR DETERMINING LOADING OF AN EMISSIONS TRAP BY USE OF TRANSFER FUNCTION ANALYSIS

(75) Inventors: Helmut Venghaus, Ingolstadt (DE); Lee Watts, Gerstofen (DE); Andreas Mayr, Meitingen (DE); Clive D. Telford, Lancaster (GB); Marco Ranalli, Augsburg (DE); Peter Kroner, Augsburg (DE); David Herranz, Pamplona (ES); Gregg Speer, Dachau (DE); Stefan Schmidt, Langweid/Lech., OH (US); A. Steven Walleck, Lakewood, OH (US)

(73) Assignee: EMCON Technologies, LLC, Wilmington, DE (US)

( * ) Notice: Subject to any disclaimer, the term of this patent is extended or adjusted under 35 U.S.C. 154(b) by 0 days.

(21) Appl. No.: 11/331,261

(22) Filed: Jan. 12, 2006

(65) Prior Publication Data

US 2007/0157609 A1 Jul. 12, 2007

(51) Int. Cl.
F01N 3/00 (2006.01)
(52) U.S. Cl. .................. 60/285; 60/277; 60/295; 60/297; 701/109; 701/112
(58) Field of Classification Search .............. 60/274, 60/277, 285, 287, 291, 295, 297; 702/109, 702/112
See application file for complete search history.

(56) References Cited

U.S. PATENT DOCUMENTS

| | | | |
|---|---|---|---|
| 5,371,686 A | 12/1994 | Nabity et al. | |
| 5,579,637 A * | 12/1996 | Yamashita et al. | 60/276 |
| 5,948,964 A | 9/1999 | Kato | |
| 6,607,447 B2 | 8/2003 | Casal et al. | |
| 6,702,991 B1 | 3/2004 | Smaling et al. | |
| 6,742,330 B2 * | 6/2004 | Genderen | 60/286 |
| 6,758,035 B2 | 7/2004 | Smaling | |
| 6,843,054 B2 | 1/2005 | Taylor, III et al. | |
| 6,871,489 B2 | 3/2005 | Tumati et al. | |
| 6,959,542 B2 | 11/2005 | Taylor, III et al. | |
| 6,964,694 B2 * | 11/2005 | Rauchfuss et al. | 95/1 |
| 7,047,729 B2 * | 5/2006 | van Nieuwstadt et al. | 60/286 |
| 7,111,455 B2 * | 9/2006 | Okugawa et al. | 60/295 |
| 7,150,145 B2 * | 12/2006 | Patchett et al. | 60/286 |
| 7,152,392 B2 * | 12/2006 | Kuboshima et al. | 60/277 |
| 2004/0031386 A1 | 2/2004 | Rauchfuss et al. | |
| 2005/0119822 A1 | 6/2005 | Sumilla et al. | |

OTHER PUBLICATIONS

"ES 145/215—Introduction To Systems Analysis With Physiological Applications," *Harvard University Division of Engineering and Applied Sciences*, (Fall 2004).

Juha Plunt, "Strategy for transfer path analysis (TPA) applied to vibro-acoustic systems at medium and high frequencies," *Paper presented at ISMA*, 23, Sep. 16-18, Leuven, Belgium, (before Jun. 2005).

(Continued)

*Primary Examiner*—Binh Q. Tran
(74) *Attorney, Agent, or Firm*—Barnes & Thornburg LLP

(57) ABSTRACT

An apparatus comprises an emissions trap and a transfer function device. The transfer function device is configured to determine a transfer function of the emissions trap wherein the transfer function is representative of loading of the emissions trap. An associated method is disclosed.

16 Claims, 2 Drawing Sheets

OTHER PUBLICATIONS

Transfer Function Analysis, (May 12, 2005), (2 pages).
Transfer Function, Wikipedia, (May 12, 2005), (3 pages).
Haneda et al., "In Situ Fourier Transform Infrared Study of the Selective Reduction of NO with Propene over $GA_2O_3$-$Al_2O_3$," *Journal of catalysis*, 206, 114-124, (2002).
David Herrin, Transfer Path Analysis, (May 5, 2003), (5 pages).
Chalk, Steven, U.S. department of Energy, FY 2000, Progress Report for Combustion and Emission Control for Advanced CIDI Engines, Nov. 2000 (retrieved from the Internet). <URL: http://www1.eere.energy.gov/vehiclesandfuels/pdfs/program/2000_pr_adv_cidi.pdf>.
International Search Report for International Application No. PCT/US 07/60311, Oct. 24, 2007, 9 pgs.

* cited by examiner

METHOD AND APPARATUS FOR DETERMINING LOADING OF AN EMISSIONS TRAP BY USE OF TRANSFER FUNCTION ANALYSIS

FIELD OF THE DISCLOSURE

The present disclosure relates generally to emissions traps for trapping emissions present in exhaust gas.

BACKGROUND OF THE DISCLOSURE

Emissions traps are used to trap and thus remove emissions from exhaust gas to reduce discharge of emissions to the atmosphere. From time to time, emissions traps are "regenerated." During such regeneration events, emissions trapped by an emissions trap are purged therefrom for further use of the emissions trap.

A particulate filter is one type of emissions trap. A particulate filter is used to trap and thus remove soot from exhaust gas. It is regenerated by burning off the particulate filter thereby.

A NOx trap is another type of emissions trap. A NOx trap is used to trap and thus remove NOx (i.e., oxides of nitrogen) from exhaust gas when the exhaust gas is relatively lean (i.e., has excess oxygen). The NOx trap is regenerated in the presence of a NOx-reducing agent [e.g., fuel, hydrogen ($H_2$), carbon monoxide].

SUMMARY OF THE DISCLOSURE

According to an aspect of the present disclosure, there is provided an apparatus comprising an emissions trap and a transfer function device configured to determine a transfer function of the emissions trap wherein the transfer function is representative of loading of the emissions trap. If the transfer function satisfies predetermined regeneration criteria, a trap regenerator can be operated by the transfer function device to regenerate the emissions trap. An associated method is disclosed.

In an exemplary embodiment, the transfer function device comprises an input pulsation sensor, an output pulsation sensor, and a controller. The input pulsation sensor is configured to sense an input pressure pulsation wave of exhaust gas at a location associated with an exhaust gas input portion of the emissions trap and to generate an input pulsation signal representative of the input pressure pulsation wave. The output pulsation sensor is configured to sense an output pressure pulsation wave of exhaust gas at a location associated with an exhaust gas output portion of the emissions trap and to generate an output pulsation signal representative of the output pressure pulsation wave.

The controller is electrically coupled to the input pulsation sensor and the output pulsation sensor. The controller is configured to determine the transfer function of the emissions trap based on the input pulsation signal and the output pulsation signal and configured to operate the trap regenerator to regenerate the emissions trap for further use if the regeneration criteria satisfies the predetermined regeneration criteria. Temperature information associated with the exhaust gas input portion and/or the exhaust gas output portion may be provided to the controller for modification of the transfer function.

Exemplarily, the emissions trap includes a particulate filter and/or a NOx trap.

The above and other features of the present disclosure will become apparent from the following description and the attached drawings.

DETAILED DESCRIPTION OF THE DRAWINGS

Figure 1:
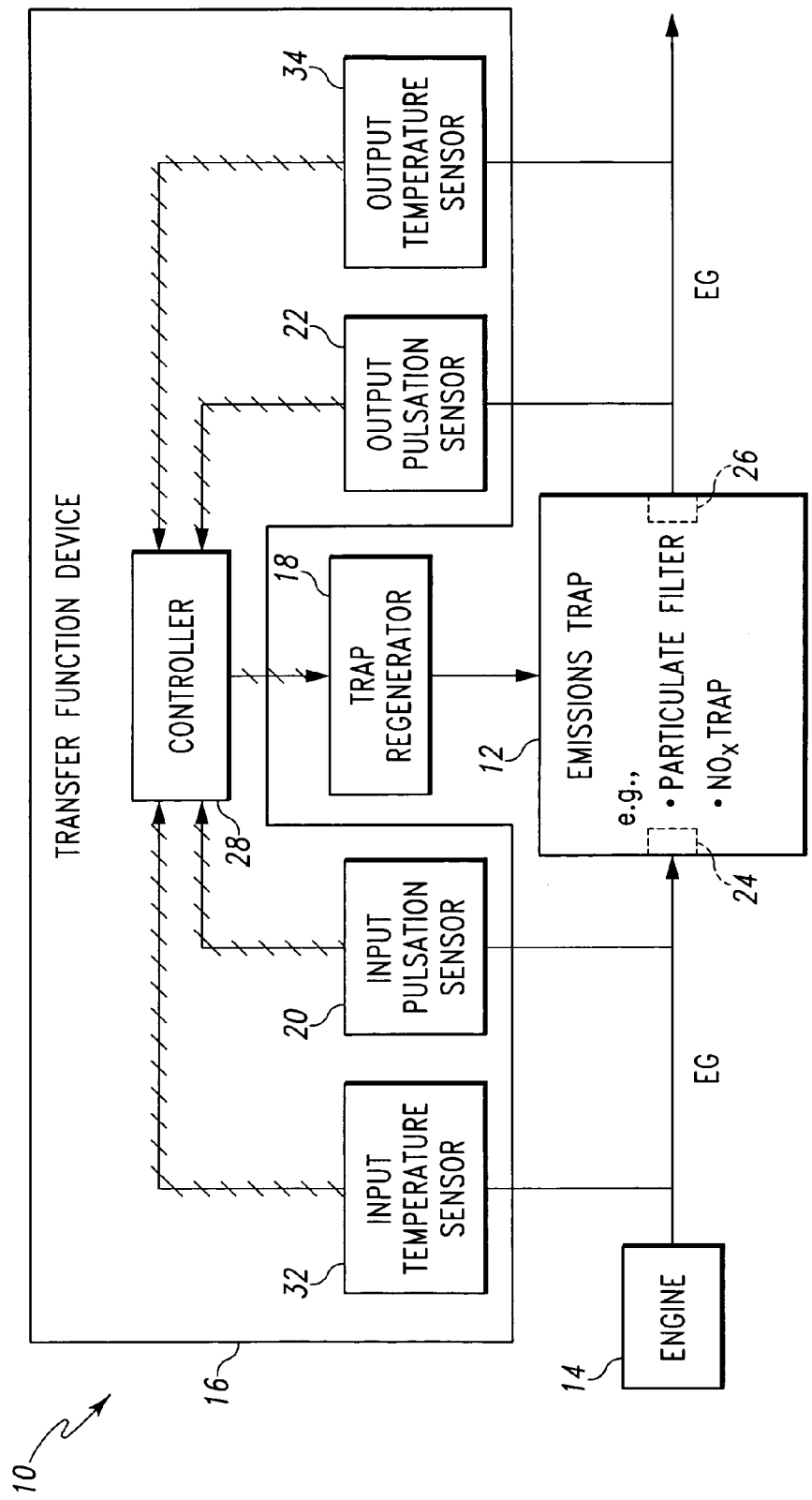
FIG. 1 is a simplified block diagram showing an apparatus for determining a transfer function of an emissions trap and for regenerating the emissions trap if the transfer function satisfies predetermined regeneration criteria.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 2:
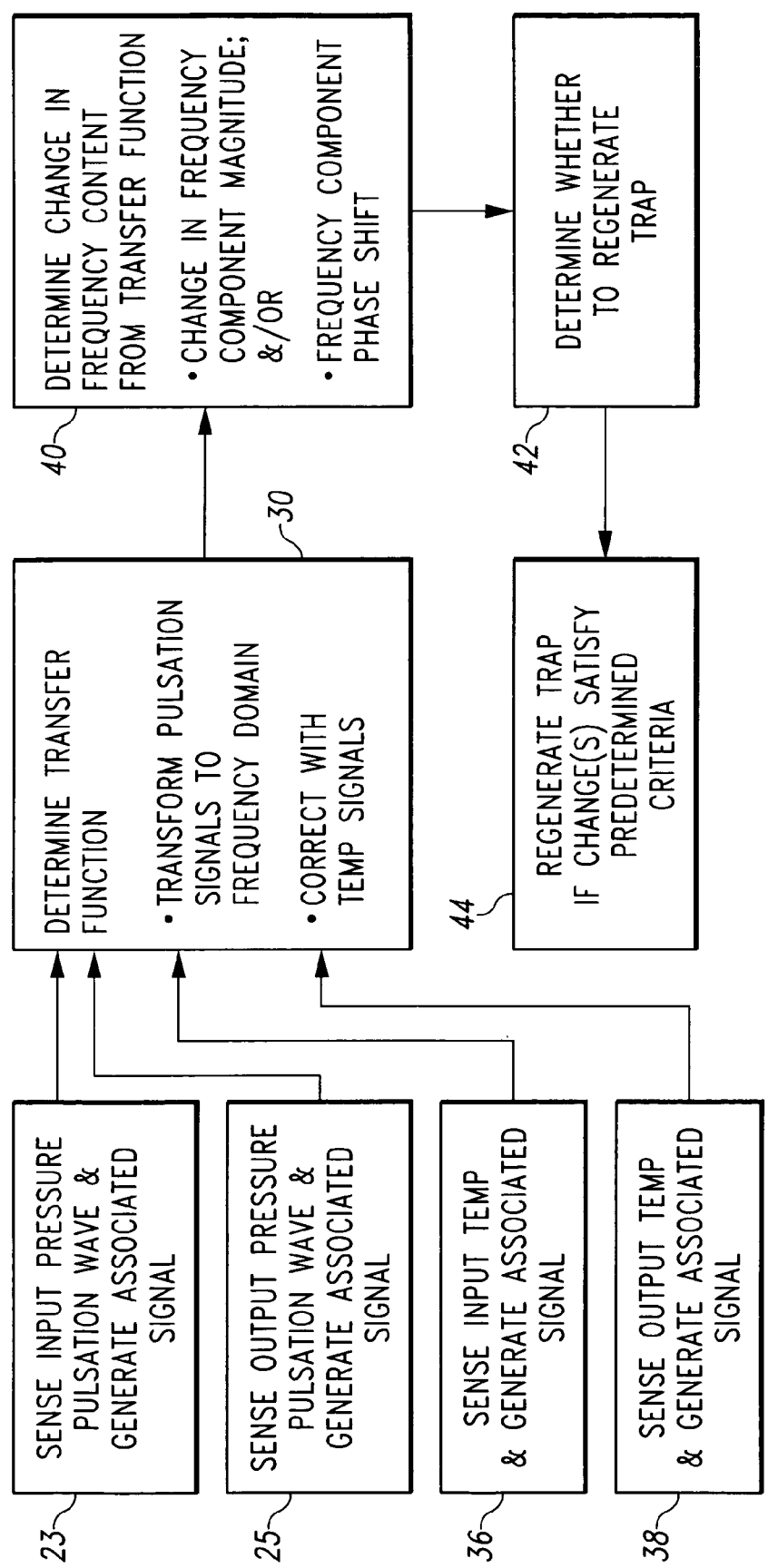
FIG. 2 is simplified flow chart of a method associated with operation of the apparatus of FIG. 1.

Referring to FIGS. 1 and 2, there is shown an apparatus 10 for determining a transfer function of an emissions trap 12, the transfer function being representative of loading of the emissions trap, and for regenerating the emissions trap 12 if the transfer function satisfies predetermined regeneration criteria. The emissions trap 12 is used to trap emissions present in exhaust gas ("EG" in FIG. 1) of an engine 14 (e.g., a diesel engine or other internal combustion engine). A transfer function device 16 determines the transfer function of the emissions trap 12 and operates a trap regenerator 18 to regenerate the trap 12 for further use if the transfer function satisfies the predetermined regeneration criteria.

The emissions trap 12 may take a variety of forms. Exemplarily, the emissions trap 12 includes a particulate filter and/or a NOx trap. In the case where a particulate filter is included, the particulate filter (e.g., a diesel particulate filter) traps particulate matter present in the exhaust gas. From time to time, the particulate matter needs to be removed from the particulate filter so as to regenerate the particulate filter for further use. The transfer function device 16 may be used to determine a transfer function of the particulate filter wherein the transfer function represents loading of the particulate filter with particulate matter. If the transfer function satisfies the predetermined regeneration criteria, the device 16 signals operation of the trap regenerator 18 to burn off the trapped particulate matter so as to regenerate the particulate filter.

In the case where a NOx trap is used, the NOx trap traps NOx present in the exhaust gas when the environment around the NOx trap is relatively fuel-lean. From time to time, the NOx needs to be removed from the NOx trap so as to regenerate the NOx trap for further use. The transfer function device 16 may be used to determine a transfer function of the NOx trap wherein the transfer function represents loading of the NOx trap with NOx. If the transfer function satisfies the predetermined regeneration criteria, the device 16 signals operation of the trap regenerator 18 to enrich the environment around the NOx trap to reduce the trapped NOx so as to regenerate the NOx trap. It is within the scope of this disclosure for the transfer function to be representative of not only trapped NOx but also other emissions such as sulphur-based emissions (e.g., oxides of sulphur or "SOx"). In such a case, the transfer function device 16 can be used to signal operation of the trap regenerator 18 to also remove such other emissions.

The transfer function device 16 is used to determine the transfer function of the emissions trap 12. What is meant herein by the term "transfer function" is a mathematical representation in a frequency domain of the relation between an input of the emissions trap 12 and an output of the emissions trap 12. For example, the transfer function can be determined by transforming (e.g., by a Fourier transformation, a LaPlace transformation, or a Z transformation) each of the input and the output into the frequency domain and forming a ratio of the transformed output over the transformed input to arrive at the transfer function.

Changes in the frequency content between the input and output can thus be determined from the transfer function. Such frequency content changes include changes in the magnitude of one or more frequency component(s) and/or phase shift(s) of one or more frequency component(s). Loading of the emissions trap 12 is thus represented by such frequency content changes. If one or both of such frequency content changes satisfies the predetermined regeneration criteria, the transfer function device 16 is configured to instruct the trap regenerator 18 to regenerator the trap 12.

Exemplarily, the transfer function device 16 is used to determine a transfer function associated with exhaust gas pressure pulsations that travel through the emissions trap 12. In such a case, the transfer function device 16 has an input pulsation sensor 20 and an output pulsation sensor 22.

At step 23, the input pulsation sensor 20 senses an input pressure pulsation wave of exhaust gas at a location associated with an exhaust gas input portion 24 of the trap 12 and generates an input pulsation signal representative of the input pressure pulsation wave. At step 25, the output pulsation sensor 22 senses an output pressure pulsation wave of exhaust gas at a location associated with the output portion 26 and generates an output pulsation signal representative of the output pressure pulsation wave.

A controller 28 of the device 16 is electrically coupled to the sensors 20 and 22 to receive the input pulsation signal and the output pulsation signal therefrom. At step 30, the controller 28 transforms those signals into the frequency domain and then determines the transfer function from such transformed information. As such, the controller 28 determines the transfer function based on the input and output pulsation signals.

Exemplarily, the input pulsation signal and the output pulsation signal are analog signals. In such a case, the controller 28 has an analog-to-digital converter for converting the analog signals to digital signals. In addition, the controller 28 comprises a digital signal processor for processing the signals according to instructions stored in a memory of the controller 28. Specifically, the digital signal processor transforms the signals by a Z transformation and determines the transfer function therefrom.

The temperature of the exhaust gas may affect the accuracy of the transfer function in representing loading of the emissions trap. As such, the device 16 may have an input temperature sensor 32 and an output temperature sensor 34 for use in correcting the transfer function due to variations in the exhaust gas temperature.

At step 36, the input temperature sensor 32 senses an input temperature of exhaust gas at a location associated with the exhaust gas input portion 24 and generates an input temperature signal representative of the input temperature. At step 38, the output temperature sensor senses an output temperature of exhaust gas at a location associated with the output portion 26 and generates an output temperature signal representative of the output temperature.

The controller 28 is electrically coupled to the sensors 32 and 34 to receive the input temperature signal and the output temperature signal therefrom. At step 30, the controller 28 uses those temperature signals to correct the transfer function for temperature. As such, the controller 28 determines the transfer function based on the input temperature signal and the output temperature signal.

It is contemplated herein that the device 16 has only one temperature sensor (i.e., sensor 32 or sensor 34) in front of or behind the trap 12. In such a case, it is to be understood that the single temperature sensor may be sufficient to determine the exhaust gas temperature for transfer function correction. More particularly, the controller 28 receives the temperature signal from that temperature sensor and corrects the transfer function based on such temperature information. However, use of both temperature sensors 32 and 34 may provide more precise exhaust gas temperature measurements and thus more precise transfer function correction calculations.

At step 40, at least one change in the frequency content of the pressure pulsations due to passage through the emissions trap 12 is determined based on the transfer function. Specifically, change(s) in the magnitude of one or more frequency components of the exhaust gas pressure pulsations and/or phase shift(s) of one more frequency components of the pressure pulsations is/are determined from the transfer function. Such change(s) represent the loading of the emissions trap 12.

At step 42, the controller 28 determines whether such change(s) satisfy/satisfies the predetermined regeneration criteria. If not, the trap 12 is not regenerated by the trap regenerator 18. However, if the predetermined regeneration criteria is satisfied, at step 44 the controller 28 signals the trap regenerator 18 to regenerate the trap 12.

For example, it may be determined from the transfer function that the magnitude of a particular frequency (e.g., in the range between about 5 kHz and about 6 kHz) of the exhaust gas pressure pulsations has been attenuated or possibly amplified as a result of passage through the trap 12. In such a case, the regeneration criteria may be such that the trap 12 is regenerated if the magnitude of that frequency is attenuated/amplified beyond a threshold. Such criteria may apply to a number of frequencies. According to another example, it may be determined from the transfer function that there has been a phase shift associated with the frequency or frequencies of interest. In such a case, the trap 12 may be regenerated if the phase shift(s) exceed(s) a predetermined threshold. The regeneration criteria may be established so as to consider both magnitude change(s) and phase shift(s). As can be seen, a variety of regeneration criteria may be used depending on factors such as the type of emissions trap, the amount of loading permissible for a given application of the trap, and/or other considerations.

While the concepts of the present disclosure have been illustrated and described in detail in the drawings and foregoing description, such illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features.

Those of ordinary skill in the art may readily devise their own implementations of a system that incorporate one or more of the features of the present disclosure and fall within the spirit and scope of the invention as defined by the appended claims.

The invention claimed is:

1. A method, comprising the steps of:
    sensing an input pressure pulsation wave of exhaust gas at a location associated with an exhaust gas input portion of an emissions trap and generating an input pulsation signal representative of the input pressure pulsation wave,
    sensing an output pressure pulsation wave of exhaust gas at a location associated with an exhaust gas output portion of the emissions trap and generating an output pulsation signal representative of the output pressure pulsation wave,
    determining a transfer function of the emissions trap based on the input pulsation signal and the output pulsation signal, the transfer function being representative of loading the emissions trap, and
    regenerating the emissions trap if the transfer function satisfies predetermined regeneration criteria, wherein:
    the determining step comprises transforming the input pulsation signal and the output pulsation signal to a frequency domain, and
    the regenerating step comprises (i) determining a change between the frequency content of the input pulsation signal and the frequency content of the output pulsation signal and (ii) regenerating the emissions trap if the frequency content change satisfies the predetermined regeneration criteria.

2. The method of claim 1, wherein:
    the change-determining step comprises determining at least one change in the magnitude of at least one frequency component, and
    the regenerating step comprises regenerating the emissions trap if the at least one magnitude change satisfies the predetermined regeneration criteria.

3. The method of claim 1, wherein:
    the change-determining step comprises determining at least one phase shift of at least one frequency component, and
    the regenerating step comprises regenerating the emissions trap if the at least one phase shift satisfies the predetermined regeneration criteria.

4. The method of claim 1, wherein:
    the change-determining step comprises (i) determining at least one change in the magnitude of at least one frequency component and (ii) determining at least one phase shift of at least one frequency component, and
    the regenerating step comprises regenerating the emissions trap if the at least one magnitude change or the at least one phase shift satisfies the predetermined regeneration criteria.

5. The method of claim 1, wherein the determining step comprises:
    sensing a temperature of exhaust gas at a location associated with the exhaust gas input portion or exhaust gas output portion of the emissions trap and generating a temperature signal representative of the sensed temperature, and
    determining the transfer function based on the temperature signal.

6. The method of claim 1, wherein the determining step comprises:
    sensing an input temperature of exhaust gas at a location associated with the exhaust gas input portion of the emissions trap and generating an input temperature signal representative of the input temperature, and
    sensing an output temperature of exhaust gas at a location associated with the exhaust gas output portion of the emissions trap and generating an output temperature signal representative of the output temperature,
    determining the transfer function based on the input temperature signal and the output temperature signal.

7. The method of claim 1, wherein:
    the determining step comprises determining a transfer function of one or both of a particulate filter or a NOx trap, and
    the regenerating step comprises regenerating the one or both of the particulate filter or the NOx trap if the transfer function satisfies the predetermined regeneration criteria.

8. An apparatus, comprising:
    an emissions trap comprising an exhaust gas input portion and an exhaust gas output portion,
    a transfer function device configured to determine a transfer function of the emissions trap that is representative of loading of the emissions trap, the transfer function device comprising a controller and a temperature sensor configured to sense a temperature of exhaust gas at a location associated with the exhaust gas input portion or exhaust gas output portion of the emissions trap and to generate a temperature signal representative of the sensed temperature, wherein the controller is configured to determine the transfer function based on the temperature signal, wherein:
    the transfer function device comprises an input pulsation sensor, an output pulsation sensor, and a controller,
    the input pulsation sensor configured to sense an input pressure pulsation wave of exhaust gas at a location associated with the exhaust gas input portion and to generate an input pulsation signal representative of the input pressure pulsation wave,
    the output pulsation sensor that is associated with the exhaust gas output portion to sense an output pressure pulsation wave of exhaust gas at a location associated with the exhaust gas output portion and to generate an output pulsation signal representative of the output pressure pulsation wave, and
    the controller is electrically coupled to the input pulsation sensor and the output pulsation sensor and is configured to determine the transfer function of the emissions trap based on the input pulsation signal and the output pulsation signal.

9. The apparatus of claim 8, further comprising a trap regenerator, wherein the controller is electrically coupled to the trap regenerator to operate the trap regenerator to regenerate the emissions trap if the transfer function satisfies predetermined regeneration criteria.

10. An apparatus, comprising:
    an emissions trap comprising an exhaust gas input portion and an exhaust gas output portion,
    an input pulsation sensor configured to sense an input pressure pulsation wave of exhaust gas at a location associated with the exhaust gas input portion and to generate an input pulsation signal representative of the input pressure pulsation wave,
    an output pulsation sensor that is associated with the exhaust gas output portion to sense an output pressure pulsation wave of exhaust gas at a location associated with the exhaust gas output portion and to generate an output pulsation signal representative of the output pressure pulsation wave, a controller electrically coupled to the input pulsation sensor and the output pulsation sensor and configured to determine a transfer function of the emissions trap based on the input pulsation signal and the output pulsation signal, the transfer function being representative of loading of the emissions trap, and a trap regenerator electrically coupled to the controller, wherein the controller is configured to transform the input pulsation signal and the output pulsation signal to a frequency domain and to determine a change between the frequency content of the input pulsation signal and the frequency content of the output pulsation signal, and the controller is configured to operate the trap regenerator to regenerate the emissions trap if the frequency content change satisfies predetermined regeneration criteria.

11. The apparatus of claim 10, wherein:
the controller is configured to determine at least one change in the magnitude of at least one frequency component, and
the controller is configured to operate the trap regenerator if the at least one magnitude change satisfies the predetermined regeneration criteria.

12. The apparatus of claim 10, wherein:
the controller is configured to determine at least one phase shift of at least one frequency component, and
the controller is configured to operate the trap regenerator if the at least one phase shift satisfies the predetermined regeneration criteria.

13. The apparatus of claim 10, wherein:
the controller is configured to determine at least one change in the magnitude of at least one frequency component and to determine at least one phase shift of at least one frequency component, and
the controller is configured to operate the trap regenerator if the at least one magnitude change or the at least one phase shift satisfies the predetermined regeneration criteria.

14. The apparatus of claim 10,
further comprising:
an input temperature sensor configured to sense an input temperature of exhaust gas at a location associated with the exhaust gas input portion of the emissions trap and to generate an input temperature signal representative of the input temperature,
an output temperature sensor configured to sense an output temperature of exhaust gas at a location associated with the exhaust gas output portion of the emissions trap and to generate an output temperature signal representative of the output temperature,
wherein the controller is configured to determine the transfer function based on the input temperature signal and the output temperature signal.

15. The apparatus of claim 10, wherein the emissions trap comprises one or both of a particulate filter or a NOx trap.

16. The apparatus of claim 8, further comprising a trap regenerator, wherein the transfer function device is electrically coupled to the trap regenerator to operate the trap regenerator to regenerate the emissions trap if the transfer function satisfies predetermined regeneration criteria.

* * * * *